(12) United States Patent
Lim et al.

(10) Patent No.: US 7,965,704 B2
(45) Date of Patent: Jun. 21, 2011

(54) METHOD AND APPARATUS FOR HANDLING IMS TERMINAL'S CALL REQUEST INCLUDING REQUEST FOR REAL-TIME SERVICE RECEIVED OVER IMS DOMAIN BY CSI TERMINAL

(75) Inventors: Han-Na Lim, Siheung-si (KR); O-Sok Song, Suwon-si (KR); Tae-Sun Yeoum, Seoul (KR); Sung-Ho Choi, Suwon-si (KR); Chunying Sun, Beijing (CN); Craig Bishop, South Staines (GB)

(73) Assignee: Samsung Electronics Co., Ltd (KR)

( * ) Notice: Subject to any disclaimer, the term of this patent is extended or adjusted under 35 U.S.C. 154(b) by 704 days.

(21) Appl. No.: 11/656,655

(22) Filed: Jan. 23, 2007

(65) Prior Publication Data

US 2007/0213052 A1    Sep. 13, 2007

(30) Foreign Application Priority Data

Jan. 23, 2006  (KR) .................. 10-2006-0007034

(51) Int. Cl.
*H04L 12/66* (2006.01)
(52) U.S. Cl. ....................... 370/354; 370/352
(58) Field of Classification Search .......... 370/310, 370/351–356
See application file for complete search history.

(56) References Cited

U.S. PATENT DOCUMENTS

| | | |
|---|---|---|
| 2004/0190498 A1 | 9/2004 | Kallio et al. |
| 2004/0242227 A1 | 12/2004 | Huotari et al. |
| 2005/0025047 A1 | 2/2005 | Bodin et al. |
| 2005/0058125 A1 | 3/2005 | Mutikainen et al. |
| 2005/0083909 A1* | 4/2005 | Kuusinen et al. ............. 370/352 |

OTHER PUBLICATIONS

3GPP, "Report on alternative architecture for combining CS bearers with IMS; Release 6" 3GPP TR 23.899 V1.2.0, Jun. 2005, pp. 1-55.*
Motorola, "Registering Terminal'S CSI Capability", 3GPP TSG SA WG2 Architecture, May 9-13, 2005.
3rd Generation Partnership Project; Technical Specification Group Services and System Aspects; Report on Alternative Architectures for Combining CS Hearers With IMS; Release 6, 3 GPP TR 23.899 V1.2.0, Jun. 2005.
3rd Generation Partnership Project; Technical Specification Group Services and System Aspects; Combining CS and IMS Sevices; Stage 2; Release 7, 3 GPP TR 23.279 V1.1.0, Apr. 2005.

* cited by examiner

*Primary Examiner* — Jinsong Hu
*Assistant Examiner* — Opiribo Georgewill
(74) *Attorney, Agent, or Firm* — The Farrell Law Firm, P.C.

(57) ABSTRACT

A method and apparatus for processing an IMS terminal's call request for real-time service and non-real-time service received over an IMS domain in a CSI terminal. When deciding to use a CS call for real-time service and an IMS session for non-real-time service, the CSI terminal sends an IMS session response for the non-real-time service. In the mean time, the CSI terminal generates a CS call request for the real-time service and sends the CS call request to an AS in an IMS domain. The AS sends the CS call request in association with the IMS session response to the IMS terminal, thereby completing a call setup. For the association, the AS sends its MSISDN to the CSI terminal and identifies from the MSISDN included in the CS call request and the IMS session response that the two messages are related to the IMS terminal's call request.

5 Claims, 13 Drawing Sheets

METHOD AND APPARATUS FOR HANDLING IMS TERMINAL'S CALL REQUEST INCLUDING REQUEST FOR REAL-TIME SERVICE RECEIVED OVER IMS DOMAIN BY CSI TERMINAL

PRIORITY

This application claims the benefit under 35 U.S.C. §119 (a) of a Korean Patent Application filed in the Korean Intellectual Property Office on Jan. 23, 2006 and assigned Ser. No. 2006-7034, the disclosure of which is incorporated herein by reference.

BACKGROUND OF THE INVENTION

1. Field of the Invention

The present invention generally relates to a Combination of a Circuit Switched (CS) call and an Internet protocol Multimedia Subsystem (IMS) session (CSI) interworking. More particularly, the present invention relates to a method and apparatus for handling a call request including a request for a real-time service received from a terminal using an IMS session (IMS terminal) for a real-time voice call or video call, in a terminal capable of combined CS call and IMS session simultaneously (CSI terminal).

2. Description of the Related Art

A CS scheme, which was designed for traditional voice service and real-time service, establishes a CS-based fixed communication route between one party and the other party. An IMS scheme increases transmission efficiency and ensures security by establishing an Internet Protocol (IP) packet-based non-fixed communication route. For this reason, an IMS scheme is suitable for data service, messaging, and file transfer. An IMS scheme provides multi-user connectivity as well as a simple one-to-one call. Messages and user traffic are sent by a CS call in a CS scheme, while they are sent by an IMS session in an IMS scheme.

A combination of CS and IMS services, i.e. a CSI scheme, provides a real-time service, such as voice transmission by a CS call and an enhanced Packet-Switched (PS) service, such as messaging, file transfer, and the like, by an IMS session. A CSI-capable terminal, i.e. a CSI terminal can use an IMS session for a non-real-time PS service, simultaneously with a CS call for a real-time service.

FIG. 1 shows a CSI-supporting mobile communication network according to the prior art. A Universal Mobile Telecommunication Service (UMTS) mobile communication network based on Global System for Mobile Communications (GSM) and General Packet Radio Services (GPRS) is shown as supporting the CSI service.

Referring to FIG. 1, the CSI-supporting mobile communication network includes a Radio Access Network (RAN) 104 and a Core Network (CN) 106. The RAN 104 connects a User Equipment (UE) 102 to the CN 106. The terms "UE" and "terminal" are interchangeably used in the same sense. As configurations of the RAN 104 according to radio access technologies are known, its detailed description is not provided herein.

The CN 106 includes a CS domain 114, a PS domain 108, and an IMS domain 122. The CS domain 114 has entities supporting CS calls. Major ones of the CS entities are a Mobile Switching Center (MSC) 120 and Media GateWays (MGWs) 116 and 118. The MSC 120 processes incoming and outgoing calls of Node Bs within the RAN 104 and provides central control to the Node Bs, for the Node Bs' efficient operation. The MGWs 116 and 118 are gateways supporting bearer traffic and control traffic.

The PS domain 108 supports packet-based services and includes network nodes, such as a Serving GPRS Support Node (SGSN) 110 and a Gateway GPRS Support Node (GGSN) 112. The SGSN 110 manages information about the locations of UEs and performs security-related functionalities and access control. The GGSN 112 is an entity of a GPRS network, serving as a radio gateway between the SGSN 110 and an external network 130 like a Public Switched Telephone Network (PSTN), an Integrated Service Data Network (ISDN), a Packet Data Network (PDN), or the like. The UE 102 can access the external network 130 via the GGSN 112.

The IMS domain 122 includes entities supporting IMS sessions. Especially these entities include a Serving-Call Session Control Function (S-CSCF) 124, an Application Server (AS) 126, and a Media Gateway Control Function/Media Gateway (MGCF/MGW) 128. The S-CSCF 124 establishes an IMS session and processes a Session Initiation Protocol (SIP) message received from the UE 102. To provide a service that the UE 102 requests, the S-CSCF 124 sends the SIP message to other entities in the IMS domain 122 so the IMS session is completed. The AS 126 is an entity for providing a variety of applications to users, including e-mail or Push to talk over Cellular (PoC). The MGCF/MGW 128 is a network node for enabling communications between an IMS user and a CS user, and includes an MGCF and an MGW. For interworking between an IMS network and a legacy network, for example, between the PSTN and the CS domain 114, the MGCF is responsible for signal conversion and the MGW is responsible for media conversion.

Besides the above-described entities, other entities may exist in each domain and entities in the domains may be involved in the CSI service.

FIG. 2 shows a flow of control signals between CSI UEs for a typical CSI service. A first CSI UE 204 (CSI UE 1) and a second CSI UE 214 (CSI UE 2) are connected to a first network 202 (network 1) and a second network 212 (network 2), respectively. Network 1 includes a first PS domain 206 (PS domain 1), a first CS domain 208 (CS domain 1), and a first IMS domain 210 (IMS domain 1). Network 2 includes a second PS domain 216 (PS domain 2), a second CS domain 218 (CS domain 2), and a second IMS domain 220 (IMS domain 2).

Control signals 224 associated with a CS call for speech between CSI UE 1 and CSI UE 2 are sent over CS domain 1 and CS domain 2. Control signals 222 associated with an IMS session for a multimedia service are sent over PS domain 1, IMS domain 1, IMS domain 2, and PS domain 2. The IMS session can be controlled by the SIP. The SIP is a protocol developed by the Internet Engineering Task Force (IETF) Multiparty Multimedia Session Control (MMUSIC) Working Group as an alternative to H.323. The SIP equips platforms to signal the setup of voice and multimedia calls over IP networks.

If both UEs participating in communications are CSI-capable, control flows are executed separately over their domains. However, if both of the UEs are not CSI-capable, for example, either of the UEs is IMS-capable only, the above control flows are not viable. If a CSI UE moves to an area where no CS calls are available, for example, only PS services are available, the CSI-UE should implement a real-time service in an IMS session despite its CSI capability. Accordingly, there is a need for a technique for enabling communications between a CSI UE and an IMS UE, taking into account a network where the CSI UE is located.

SUMMARY OF THE INVENTION

The present invention addresses at least the above-described problems and/or disadvantages and provides at least the advantages described below.

Accordingly, an aspect of the present invention provides a method and apparatus for exchanging control signals for providing a real-time service and a non-real-time service between a UE capable of supporting a CS call and an IMS session simultaneously, and preferring a CS call for a real-time voice or video call service (CSI UE) and a UE which is not CS-capable and, if ever, prefers an IMS session for the real-time service (IMS UE).

Another aspect of the present invention provides a method and apparatus for providing a real-time service to a CSI UE by an IMS session as with an IMS UE, despite the CSI UE's preference for a CS call in provisioning of a real-time voice or video call service, when the CSI UE is located in a network where a CS domain is not available.

In accordance with still another aspect of the present invention, there is provided a method for processing a call request including a request for a real-time service received from an IMS terminal capable of an IMS session only in a CSI terminal simultaneously capable of a CS call and an IMS session, in which the CSI terminal receives from the IMS terminal an INVITE message including a call request for a real-time service and a non-real time service through an AS of an IMS domain, and the CSI terminal generates a CS call request message for the real-time service, transmits the CS call request message to the AS, generates an IMS session response message for the non-real-time service, and transmits the IMS session response message to the AS when the CSI terminal selects to use a CS call for the real-time service in response to the INVITE message.

In accordance with yet another aspect of the present invention, there is provided a method for processing a call request including a request for a real-time service received from an IMS terminal capable of an IMS session only in an AS for controlling call setup for a CSI terminal simultaneously capable of a CS call and an IMS session, in which the AS receives from the IMS terminal an INVITE message including a call request for a real-time service and a non-real time service over an IMS domain, transmits the INVITE message to the CSI terminal, receives an IMS session response message for the non-real-time service from the CSI terminal, and receives a CS call request message for the real-time service from the CSI terminal, generates a response message by associating the CS call request message with the IMS session response message, and transmits the response message for the call request to the IMS terminal when the IMS session response message includes an indicator indicating that the CSI terminal requests a CS call for the real-time service.

In accordance with still a further aspect of the present invention, there is provided an apparatus for processing a call request, which includes a CSI terminal simultaneously capable of a CS call and an IMS session, an IMS terminal capable of an IMS session only, and an AS in an IMS domain, for controlling call setup for the CSI terminal. The CSI terminal receives from the IMS terminal an INVITE message including a call request for a real-time service and a non-real time service through the AS, and generates a CS call request message for the real-time service, transmits the CS call request message to the AS, generates an IMS session response message for the non-real-time service, and transmits the IMS session response message to the AS when the CSI terminal selects to use a CS call for the real-time service in response to the INVITE message.

BRIEF DESCRIPTION OF THE DRAWINGS

The above and other objects, features and advantages of certain preferred embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF PREFERRED EMBODIMENTS

The matters defined in the description such as a detailed construction and elements are provided to assist in a comprehensive understanding of preferred embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention enables communications between a CSI UE that is simultaneously capable of a CS call for speech and an IMS session for a multimedia service and an IMS UE that is not capable of a CS call or prefers an IMS session for the voice call and the multimedia service. The IMS UE conducts a voice call by Voice over IP (VoIP).

Figure 1:
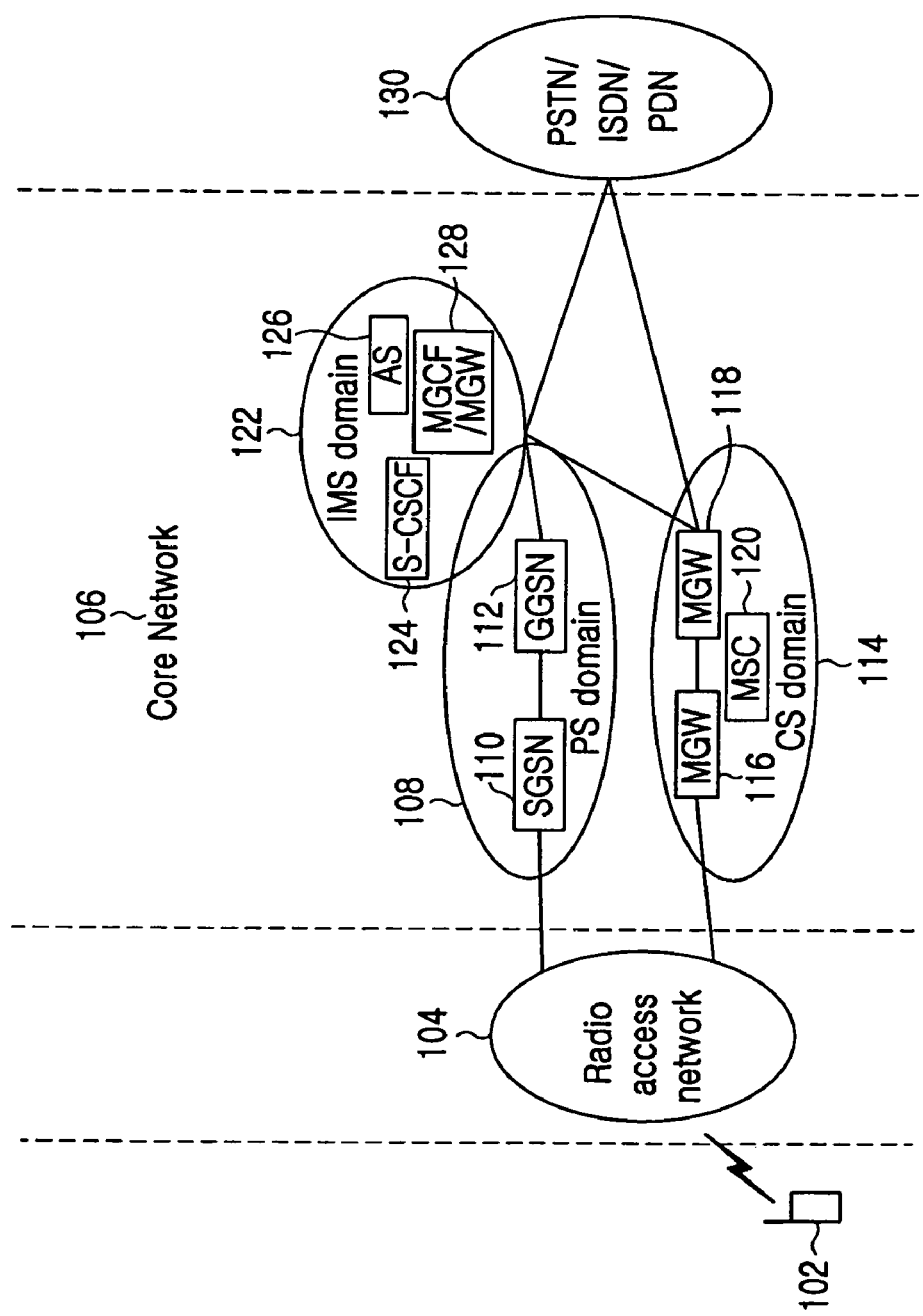
FIG. 1 illustrates the configuration of a CSI-supporting mobile communication network according to the prior art.
Figure 2:
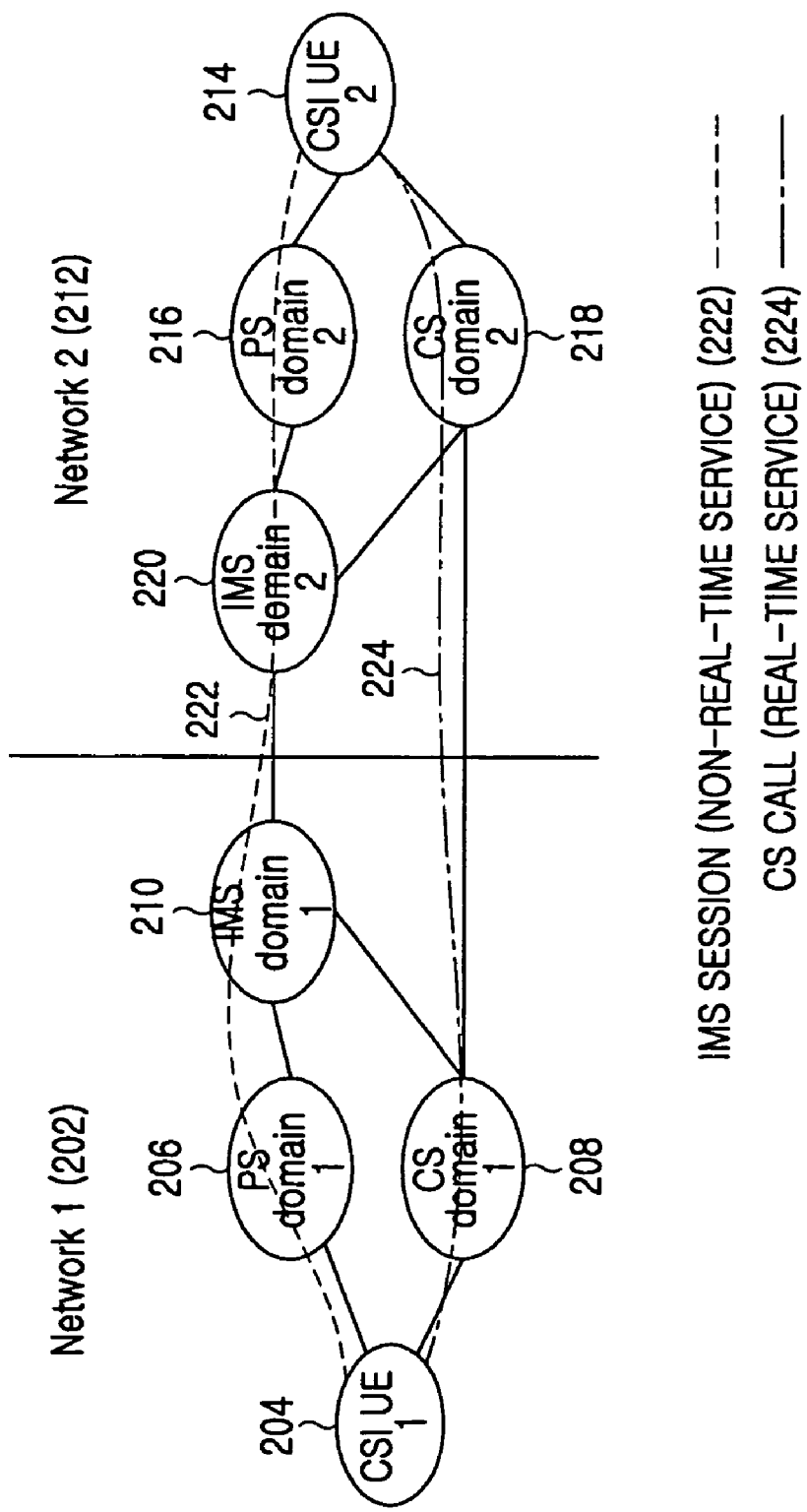
FIG. 2 is a diagram illustrating a flow of control signals between CSI UEs according to the prior art.
Figure 3:
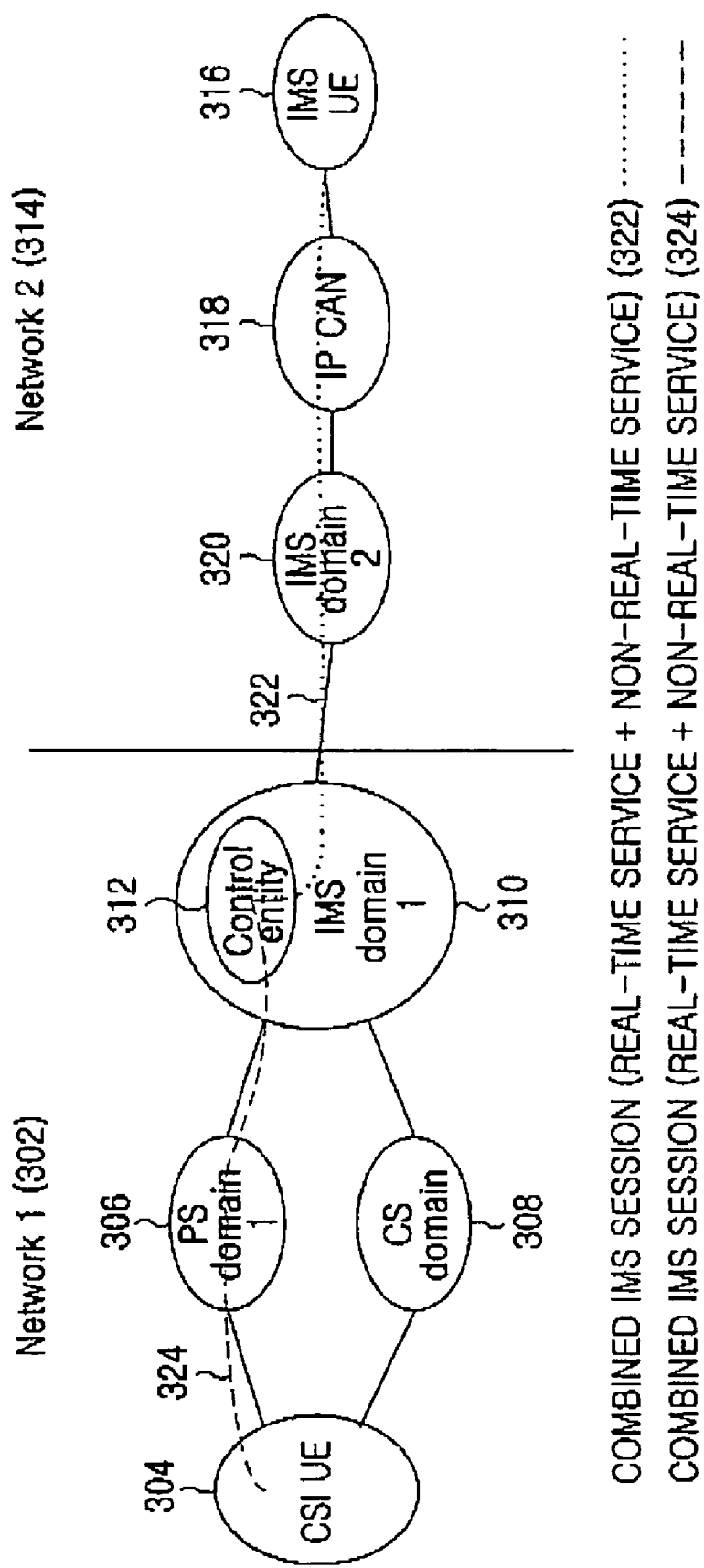
FIG. 3 is a diagram illustrating a flow of control signals between a CSI UE and an IMS UE when the CSI UE receives a real-time service over an IMS domain according to the present invention.

FIG. 3 shows a flow of control signals between a CSI UE and an IMS UE when the CSI UE receives a real-time service over an IMS domain according to the present invention. A first network 302 (network 1) where a CSI UE 304 is located includes a CS domain 308, a first PS domain 306 (PS domain 1), and a first IMS domain 312 (IMS domain 1). A second network 314 (network 2) where an IMS UE 316 is located includes a second IMS domain 320 (IMS domain 2) and an IP-Connectivity Access Network (IP-CAN) 318. The IP-CAN 318 is a network that enables IMS subscribers to access to a PS domain or the IMS domain. For an IMS session combining a real-time service and a non-real-time service (hereinafter, referred to as a combined IMS session) between the UEs 304 and 316, control signals are delivered in a route 324 which runs through PS domain 1 and IMS domain 1 in network 1 and in a route 322 running through IMS domain 2 in network 2.

Figure 4:
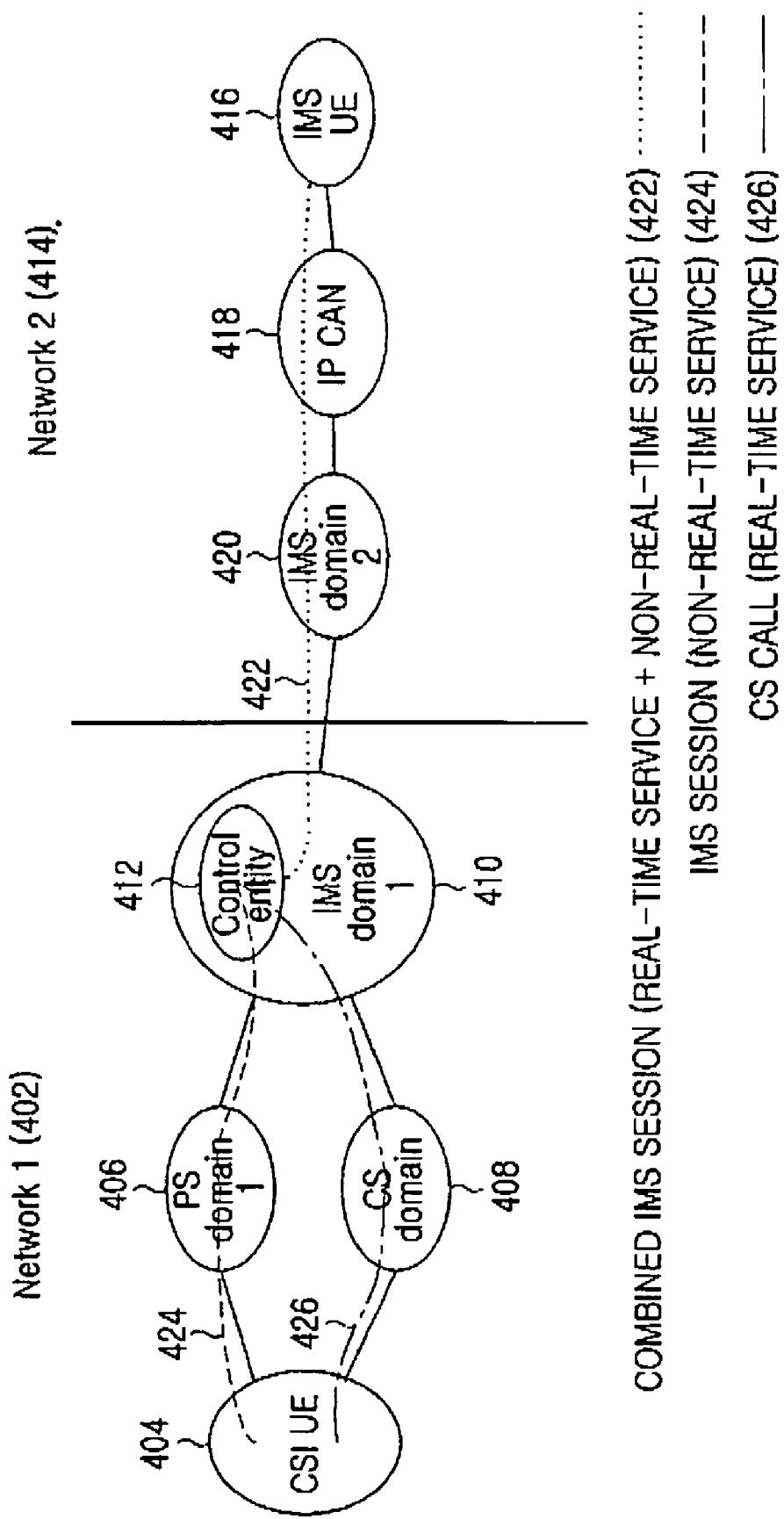
FIG. 4 is a diagram illustrating a flow of control signals between the CSI UE and the IMS UE when the CSI UE receives a real-time service over a CS domain according to the present invention.

FIG. 4 shows a flow of control signals between the CSI UE and the IMS UE when the CSI UE receives a real-time service over a CS domain according to the present invention. Control signals are delivered in a route 426 running through a CS domain 408 and a first IMS domain 410 (IMS domain 1) in a first network 402 (network 1) to provide a real-time service between two UEs 404 and 416 by a CS call. Control signals are delivered in a route 424 running through a first PS domain 406 (PS domain 1) and first and second IMS domains 410 and 420 (IMS domain 1 and IMS domain 2) to provide a non-real-time service by an IMS session. Control signals for the CSI UE 404 flow separately in the route 424 running through PS domain 1 and the route 426 running through the CS domain 408, whereas control signals for the IMS UE 416 flow in the route 422 by SIP messages related to a combined IMS session.

When the CSI UE 404 originates a call for a real-time service or a combined service of a real-time service and a non-real-time service (combined service, for short), there is no problem. That is, the CSI UE 404 originates the real-time service by a CS call and control signals for the CS call are converted to an IMS session in IMS domain 2 of network 2 by CS/IMS interworking. When the CSI UE 404 originates a call for the combined service, the CSI UE 404 initiates a CS call and an IMS session separately and control signals including a request for the CS call and the IMS session are delivered to the IMS UE 416 in the separate routes 424 and 426.

However, problems may occur to connection of control signals in case of call origination from the IMS UE 416. When the IMS UE 416 sends an SIP message for a real-time service toward the CSI UE 404, the SIP message is first delivered to IMS domain 1 to which the CSI UE 404 has registered. Conventionally, the SIP message is then delivered to the CSI UE 404 over PS domain 1, for setup of an IMS call. That is, the CSI UE 404 unconditionally uses a PS call instead of a CS call, for the real-time service. In this case, if the PS call does not fully support the real-time service, communication quality is degraded. The same problem occurs when the IMS UE 416 sends an SIP message for originating the combined service to the CSI UE 404.

The present invention provides a method for setting up a call by appropriately processing a call request received over IMS domain 1 in order to allow the CSI UE 404 to use the CS domain 408 for the real-time service.

Figure 5:
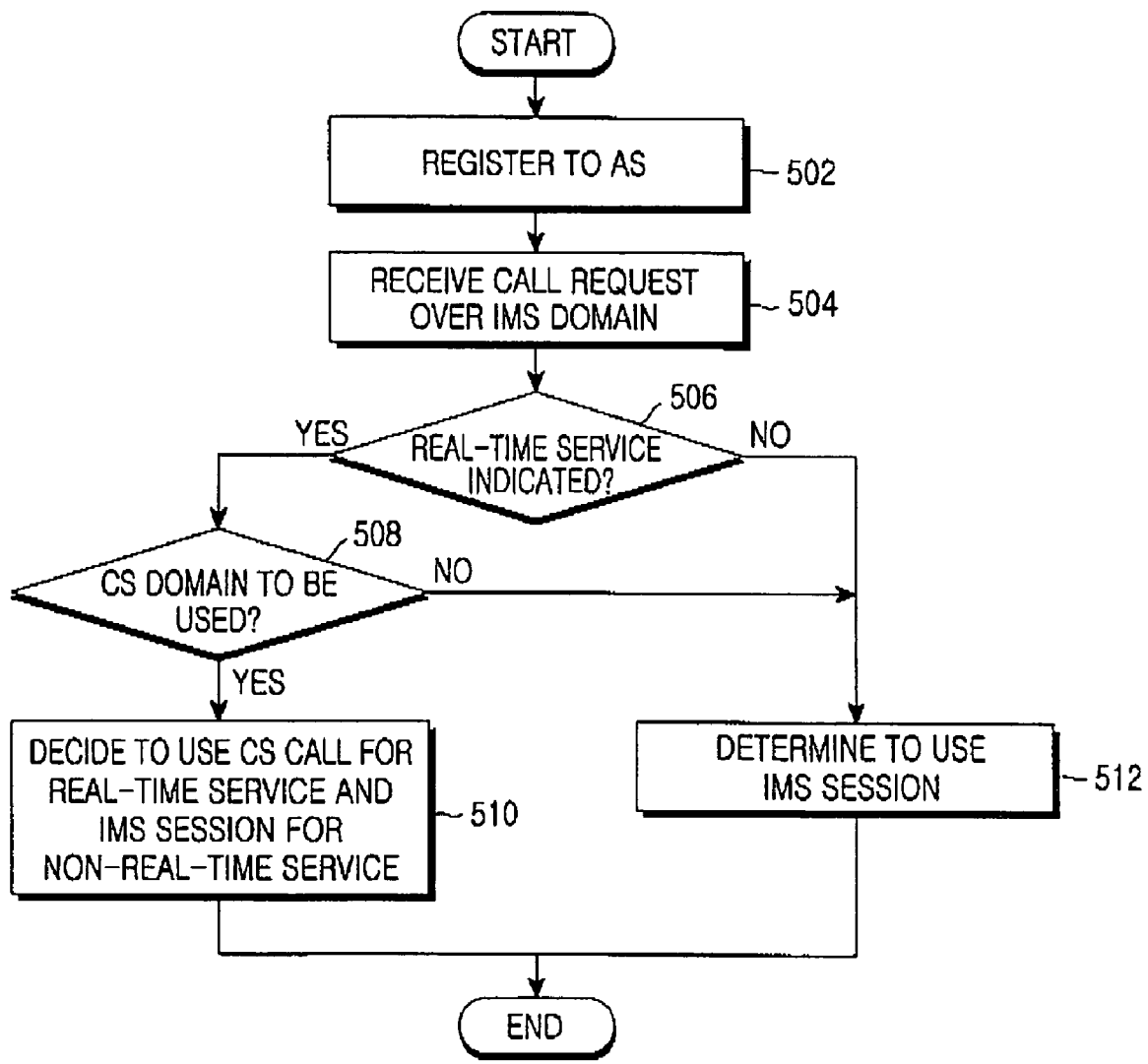
FIG. 5 is a flowchart illustrating an operation for determining domains over which a real-time service and a non-real-time service are to be received in the CSI UE according to the present invention.

FIG. 5 shows an operation for determining domains over which a real-time service and a non-real-time service are to be received in the CSI UE according to the present invention. When the CSI UE registers to the IMS domain, specifically it performs a $3^{rd}$ party registration to an AS of the IMS domain, as in a $3^{rd}$ Generation (3G) mobile communication system in step 502. Upon receipt of a call request over the IMS domain in step 504, the CSI UE determines whether services indicated by the call request includes a real-time service in step 506.

The CSI UE performs an IMS session setup with the IMS UE in a conventional manner in step 512 when the services do not include the real-time service. On the other hand, the CSI UE determines whether to use the CS domain for the real-time service, taking into account the situation of the network in step 508, when the services include the real-time service. The network situation is evaluated by checking whether the CSI UE can use the CS domain for the real-time service in the current network. For example, the CSI UE should use an IMS session for the real-time service when the CSI UE is located in a network where only a PS call is available. The CSI UE can use a CS call for the real-time service when the CSI UE is located in a network where a CS call is available. Even though the CSI UE prefers a CS call for the real-time service, the CSI UE's preference may change depending on the circumstances of the UE or the network. Therefore, the CSI UE's preference for the CS domain can be considered in the determination.

Referring to FIG. 5 again, the CSI UE decides to use an IMS session with regard to the call request of the IMS UE in step 512 when the CSI UE does not use the CS domain for the real-time service. On the contrary, the CSI UE decides to use a CS call for the real-time service in step 510 when the CSI UE uses the CS domain for the real-time service. The CSI UE decides to use an IMS session for the non-real-time service in step 510 when the services include a non-real-time service in addition to the real-time service.

In order to use a CS call or an IMS session according to service types indicated by a call request received over the IMS domain, examples of the present invention are described below.

The CSI UE generates a CS call request for the real-time service and sends it to the AS of the IMS domain. The CSI UE also sends an IMS session response for an IMS session request of the IMS UE for the non-real-time service. The AS sends the CS call request in association with the IMS session response to the IMS UE, thus completing the call setup. The present invention considers the association in three ways. The present invention also provides methods for sending a Mobile Station Integrated Services Digital Network number (MSISDN) of the AS being the AS's telephone number to the CSI UE, for the association and identifying from the MSISDN that the CS call request and the IMS session response are related to the call request of the IMS UE by the AS.

Figure 6A:
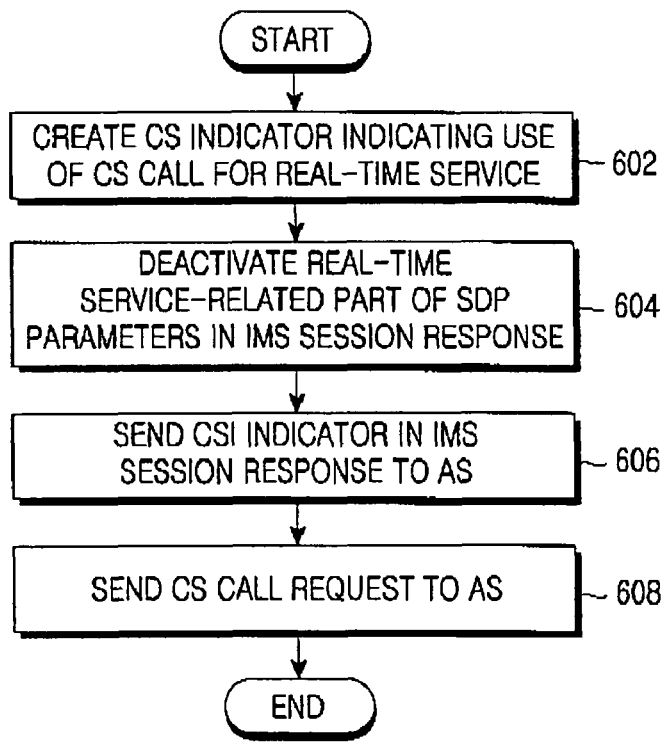
FIG. 6A is a flowchart illustrating an operation of the CSI UE according to the present invention.
Figure 6B:
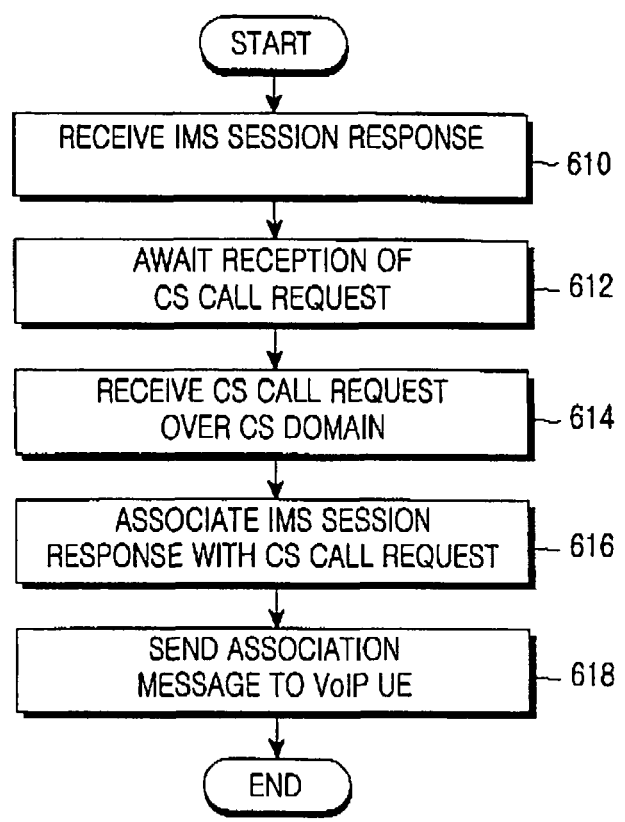
FIG. 6B is a flowchart illustrating an operation of an AS according to the present invention.

FIGS. 6A and 6B show an operation of the CSI UE and an operation of the AS according to the present invention.

Referring to FIG. 6A, the CSI UE creates a CSI indicator indicating that it will use a CS call for a real-time service included in services indicated by a call request of the IMS UE received from the AS of the IMS domain in step 602. For using an IMS session for a non-real-time service indicated by the call request, the CSI UE deactivates a real-time service-related part of Session Description Protocol (SDP) parameters to be set in an IMS session response in step 604. The SDP is a protocol used for exchanging multimedia service information. Steps 602 and 604 may take place simultaneously and their time sequence is not limited to what the procedure shown in FIG. 6A specifies.

In step 606, the CSI UE sends the CSI indicator in the IMS session response to the AS. The CSI UE then generates a CS call request for the real-time service and sends it to the AS in step 608. The MSISDN of the AS is required for the transmission of the CS call request to the AS. An MSISDN is a telephone number, a factor required for CS call origination. The MSISDN of the AS can be notified to the CSI UE in two ways. One is for the AS to send a message indicating the MSISDN to the CSI UE during registration to the network or after the registration. The other is for the AS to send the MSISDN in conjunction with a call request of the IMS UE to the CSI UE.

Referring to FIG. 6B, the AS receives the IMS session response from the CSI UE in step 610 and recognizes from the CSI indicator included in the IMS session response that the CS call request will be received from the CSI UE in step 612. Upon receipt of the CS call request for the real-time service from the CSI UE over the CS domain in step 614, the AS generates a message by associating the IMS session response with the CS call request in step 616 and sends to the IMS UE the association message as a response for the call request of the IMS UE in step 618.

For the association, the AS should identify that the IMS session response and the CS call request are a response for the call request of the IMS UE. In the present invention, a message (an IMS session response or a CS call request) sent from the CSI UE to the AS is identified as a response for a call request of the IMS UE by an Information Element (IE), such as "From, Request Universal Resource Identifier (URI)" included in the message. These will be described in conjunction with the methods for notifying the CSI UE of the MSISDN of the AS by the AS, with reference to FIGS. 7A to 9B.

FIGS. 7A to 9B show control flows according to schemes for notifying the CSI UE of the MSISDN of the AS and then associating a CS call request with an IMS session response by the AS, in the case where the AS sends an SIP-based call request, i.e. an INVITE message received from the IMS UE which wants to initiate a voice call.

Figure 7A:
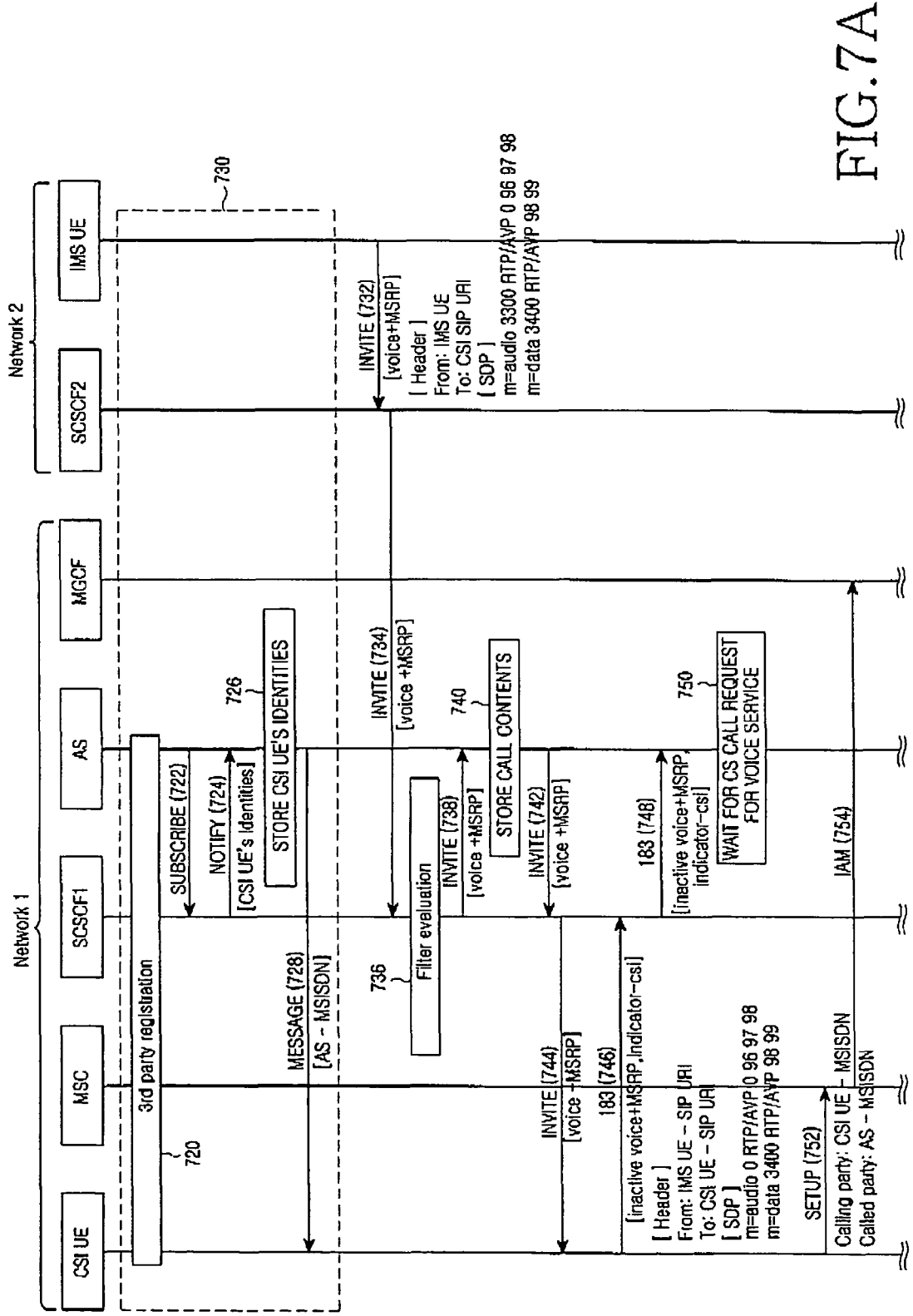
FIGS. 7A and 7B are diagrams illustrating a control flow in the case where the AS sends its Mobile Station Integrated Services Digital Network number (MSISDN) to the CSI UE by a unique stand-alone message or a registration message and uses identity information of the CSI UE received from an S-CSCF in identifying a response message according to the present invention.
Figure 7B:
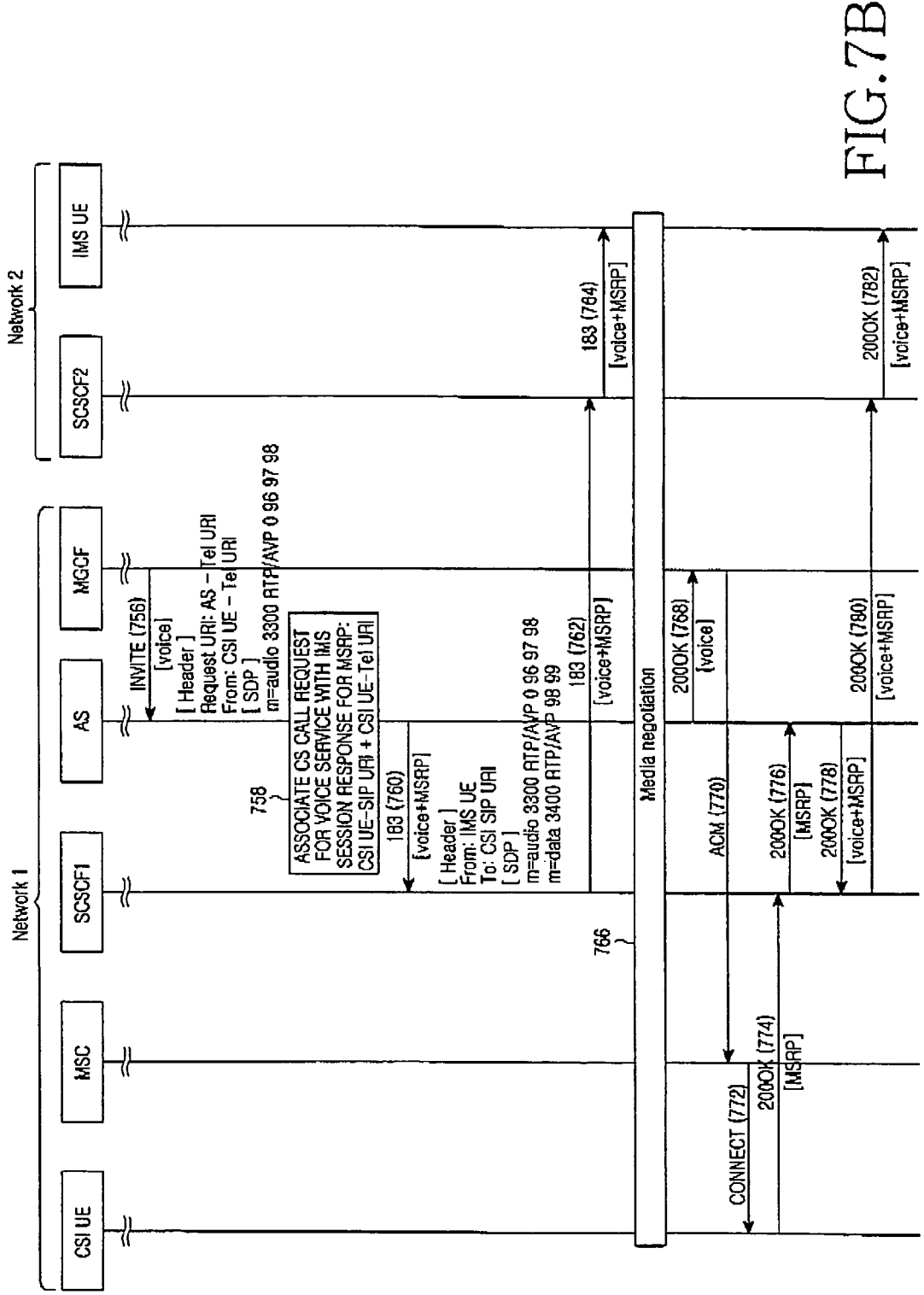

FIGS. 7A and 7B show a control flow when the AS sends its MSISDN to the CSI UE by a unique stand-alone message or a registration message used for the CSI UE's registration and uses identity information of the CSI UE received from the S-CSCF in identifying a response message according to the present invention. The CSI UE performs a 3$^{rd}$ party registration to the IMS domain in step 720. In step 722, the AS recognizes the registration of the CSI UE and queries a first S-CSCF (S-CSCF 1) about identity information of the CSI UE by a SUBSCRIBE message. S-CSCF 1 sends the identity information of the CSI UE to the AS by a NOTIFY message in step 724. The identity information of the CSI UE tells all identities identifying the CSI UE including identities of the CSI UE transferred or changed by entities. While SUBSCRIBE and NOTIFY are described as the SIP messages that request and send contents of a specific event in the procedure shown in FIGS. 7A and 7B, it is to be appreciated that they can be replaced with other messages.

The AS stores the identity information of the CSI UE in step 726 and sends its MSISDN (referred to as AS-MSISDN) to the CSI UE in step 728. While the AS-MSISDN is delivered by one of SIP methods, MESSAGE in this procedure, any other message can also be used instead. Aside from the above-described method, the AS-MSISDN can be sent to the CSI UE by one of messages generated during the 3$^{rd}$ party registration.

The present invention is described in the context of a voice call service as a major example of a real-time service using a CS call, and a messaging service based on the Message Session Relay Protocol (MSRP) as a major example of a non-real-time service using an IMS session in the CSI service. These examples are taken for notational simplicity and thus the present invention is also applicable to other various services.

Referring to FIGS. 7A and 7B again, upon receipt of an INVITE message including a call request for a voice call service and an MSRP service from the IMS UE via a second S-CSCF (S-CSCF 2) to which the IMS UE has registered in steps 732 and 734, S-CSCF 1 to which the CSI UE has registered evaluates the INVITE message according to filter criteria set for the CSI UE in step 736 and sends the INVITE message to the AS in step 738. The AS stores information about the source and destination of the INVITE message for later association in step 740 and sends the INVITE message to the CSI UE in steps 742 and 744.

The CSI UE discovers that the INVITE message includes a request for the voice call service and decides to use a CS call for the voice call service. In the case where the INVITE message includes a request for the MSRP service, the CSI UE decides to use an IMS session for the MSRP service. Then the CSI UE sets a port representing a voice service-related part of SDP parameters to 0, so as to indicate that the voice call service will not be provided by an IMS session. The SDP parameters will be included in a 183 message responding to the INVITE message. Also, the CSI UE includes a CSI indicator (indicator-csi) indicating upcoming transmission of a CS call request for the voice call service in the 183 message. Information fields included in the header of the 183 message, "From" and "To" are set to the SIP URI of the IMS UE and the SIP URI of the CSI UE, respectively. The thus-configured 183 message is sent to the AS via S-CSCF 1 in steps 746 and 748.

In step 750, the AS awaits reception of the CS call request for the voice call service in response to the CSI indicator included in the 183 message. In the mean time, the CSI UE generates a SETUP message to request a CS call for the voice call service as indicated by the INVITE message after sending the 183 message. The SETUP message is set to the MSISDN of the CSI UE as a source and to the AS-MSISDN as a destination. In step 752, the SETUP message is sent to the MSC of the CS domain. The MSC converts the SETUP message to an Initial Address Message (IAM) message and sends the IAM message to the MGCF in step 754. The source and destination of the IAM message are identical to those of the SETUP message.

In step 756, the MGCF converts the IAM message to an INVITE message and sends the INVITE message to the AS. The INVITE message is for the voice call service. The source information of the IAM message can be mapped to "P-Asserted-Identity, Privacy, From" of the INVITE message and its destination information to "Request-URI (or Request URI), To" of the INVITE message. "P-Asserted-Identity" carries a verified identity of the CSI UE, "Privacy" provides privacy information of the CSI UE, and "Request-URI" provides routing information of the INVITE message. In the present invention, it is described that the source information and destination information of the IAM message are mapped to "From" and "Request URI", respectively. Yet, the source information and destination information of the IAM message can be mapped to other elements of the INVITE message. "From" is set to the TEL URI of the CSI UE and "Request URI" is set to the TEL URI of the AS in the INVITE message that the MGCF sends to the AS in the present invention. It can be further contemplated for the present invention that the TEL URIs are replaced with SIP URIs.

In step 758, the AS generates an association 183 message by associating the 183 message received in step 748 with the INVITE message received in step 756. The AS can identify from the SIP URI of the CSI UE filled in the "To" header of the 183 message that the 183 message is a response for the call request of the IMS UE, and identify from the TEL URI of the CSI UE set in the "From" header of the INVITE message that the INVITE message is also a response for the call request of the IMS UE because the TEL URI is one of the identifies of the CSI UE stored in step 726. That is, the AS associates the 183 message with the INVITE message, recognizing that the two messages are responses for the call request of the IMS UE by the SIP URI of the CSI UE included in the 183 message and the TEL URI of the CSI UE included in the INVITE message.

In step 760, the AS sends the association 183 message to S-CSCF 1. S-CSCF 1 then sends the association 183 message to the IMS UE via S-CSCF 2 in steps 762 and 764. The AS additionally performs a media negotiation when needed in step 766. When the media negotiation is completed, the AS sends response messages indicating completion of the CS call request of the CSI UE, 200OK, Address Complete Message (ACM), and CONNECT to the MGCF, the MSC, and the CSI UE, respectively in steps 768, 770 and 772. Upon receipt of the CONNECT message, the CSI UE sends a 200OK message indicating completion of a call setup for the MSRP service to S-CSCF 1 in step 774 and S-CSCF 1 sends the 200OK message to the AS in step 776. In steps 778, 780 and 782, the AS sends to the CSI UE a 200OK message indicating completion of the call setups for the voice call service and the MSRP service, referring to step 768. In this way, the voice call setup and the MSRP call setup have been completed.

Figure 8A:
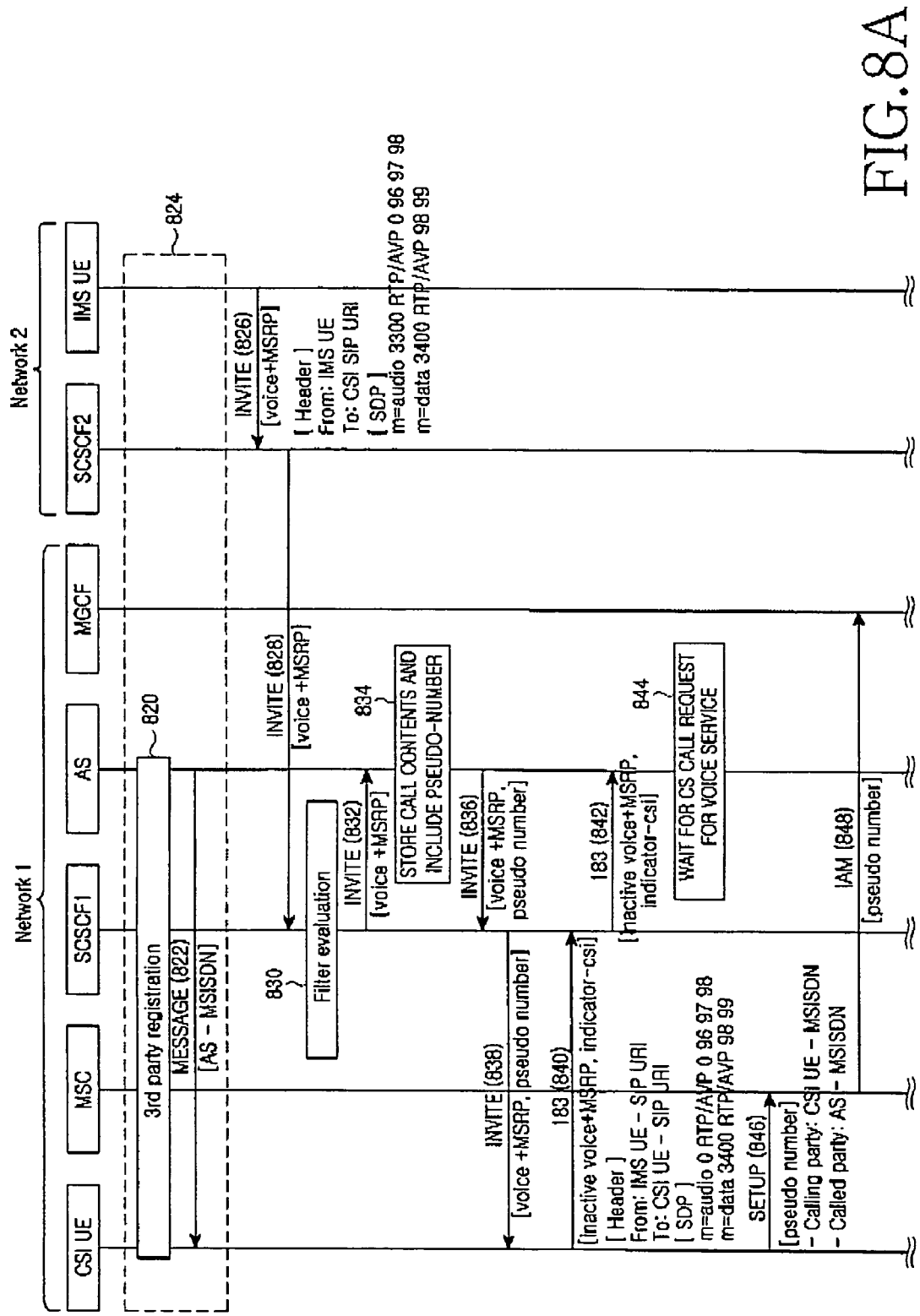
FIGS. 8A and 8B are diagrams illustrating a control flow in the case where the AS sends its MSISDN to the CSI UE by a unique stand-alone message or a registration message and uses a pseudo-number that the S-CSCF sent to the CSI UE in identifying a response message according to the present invention.
Figure 8B:
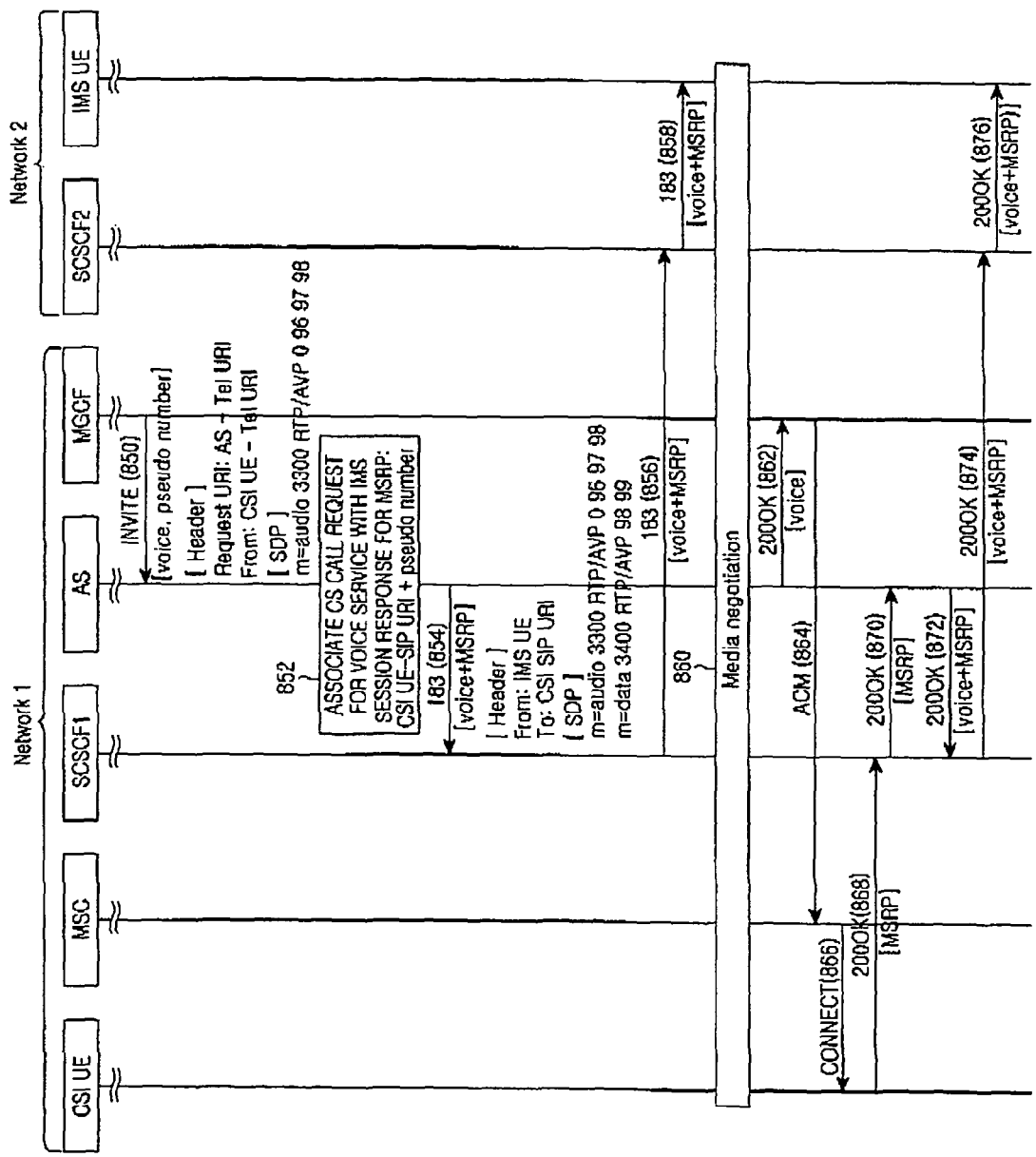

FIGS. 8A and 8B show a control flow when the AS sends its MSISDN to the CSI UE by a unique stand-alone message or a registration message and uses a pseudo-number that the AS sent to the CSI UE in identifying a response message according to the present invention.

Referring to FIGS. 8A and 8B, the CSI UE performs a $3^{rd}$ party registration to the IMS domain in step 820. In step 822, the AS sends its AS-MSISDN to the CSI UE as described before.

Upon receipt of an INVITE message including a call request for a voice service and an MSRP service from the IMS UE via S-CSCF 2 in steps 826 and 828, S-CSCF 1 evaluates the INVITE message based on the filter criteria set for the CSI UE in step 830 and sends the INVITE message to the AS in step 832. The AS stores information about the source and destination of the INVITE message for later association and includes a pseudo-number generated randomly by the AS in the INVITE message in step 834. In steps 836 and 838, the INVITE message with the pseudo-number is sent to the CSI UE via S-CSCF 1 so the AS can identify from the pseudo-number that a message for the voice service received from the CSI UE is a response for the IMS UE's call request.

Recognizing that the INVITE message includes a request for the voice service, the CSI UE determines to use a CS call for the voice service and, if the INVITE message also indicates the MSRP service, determines to an IMS session for the MSRP service. Hence, the CSI UE sets a port representing a voice service-related part of SDP parameters to 0 to indicate that the voice service is not provided by the IMS session. The SDP parameters are to be included in a 183 message responding to the INVITE message. As stated before, the CSI UE includes a CSI indicator in the 183 message and "From" and "To" are set to the SIP URI of the IMS UE and the SIP URI of the CSI UE, respectively in the header of the 183 message.

The CSI UE sends this 183 message to S-CSCF 1 in step 840 and S-CSCF 1 forwards the 183 message to the AS in step 842.

In step 844, the AS awaits reception of a CS call request for the voice service in response to the CSI indicator set in the 183 message. In the mean time, the CSI UE generates a SETUP message to request a CS call for the voice call service as indicated by the INVITE message after sending the 183 message. The SETUP message is set to the MSISDN of the CSI UE as a source and to the AS-MSISDN as a destination. The CSI UE also includes the pseudo-number received in step 838 in the SETUP message as a calling number or a called number, or in any other parameter or part of the parameter. When the MGCF converts the SETUP message to an INVITE message, the pseudo-number is also included in the INVITE message, specifically in the header of the INVITE message, a parameter of the header, or in an SDP parameter.

The SETUP message configured in this manner is sent to the MSC of the CS domain in step 846. The MSC converts the SETUP message to an IAM message and sends the IAM message to the MGCF in step 848. The source and destination of the IAM message are identical to those of the SETUP message. In step 850, the MGCF converts the IAM message to the INVITE message and sends the INVITE message to the AS. As stated above, the pseudo-number is included in the INVITE message.

The INVITE message is for the voice service. The source and destination mapping between of the IAM message and the INVITE message has been described with reference to FIG. 7 and thus will not be described herein. In accordance with the present invention, "From" and "Request URI" are set to the TEL URI of the CSI UE and the TEL URI of the AS in the INVITE message that the MGCF sends to the AS. These TEL URIs can be replaced with SIP URIs as stated before with reference to FIG. 7.

In step 852, the AS generates an association 183 message by associating the 183 message received in step 840 with the INVITE message received in step 850. The AS can identify from the SIP URI of the CSI UE filled in the "To" header of the 183 message that the 183 message is a response for the call request of the IMS UE, and identify from the pseudo-number set in the INVITE message that the INVITE message is also a response for the call request of the IMS UE.

In steps 854 to 876, a voice call setup and an MSRP call setup are performed in the same manner described in FIG. 7.

Figure 9A:
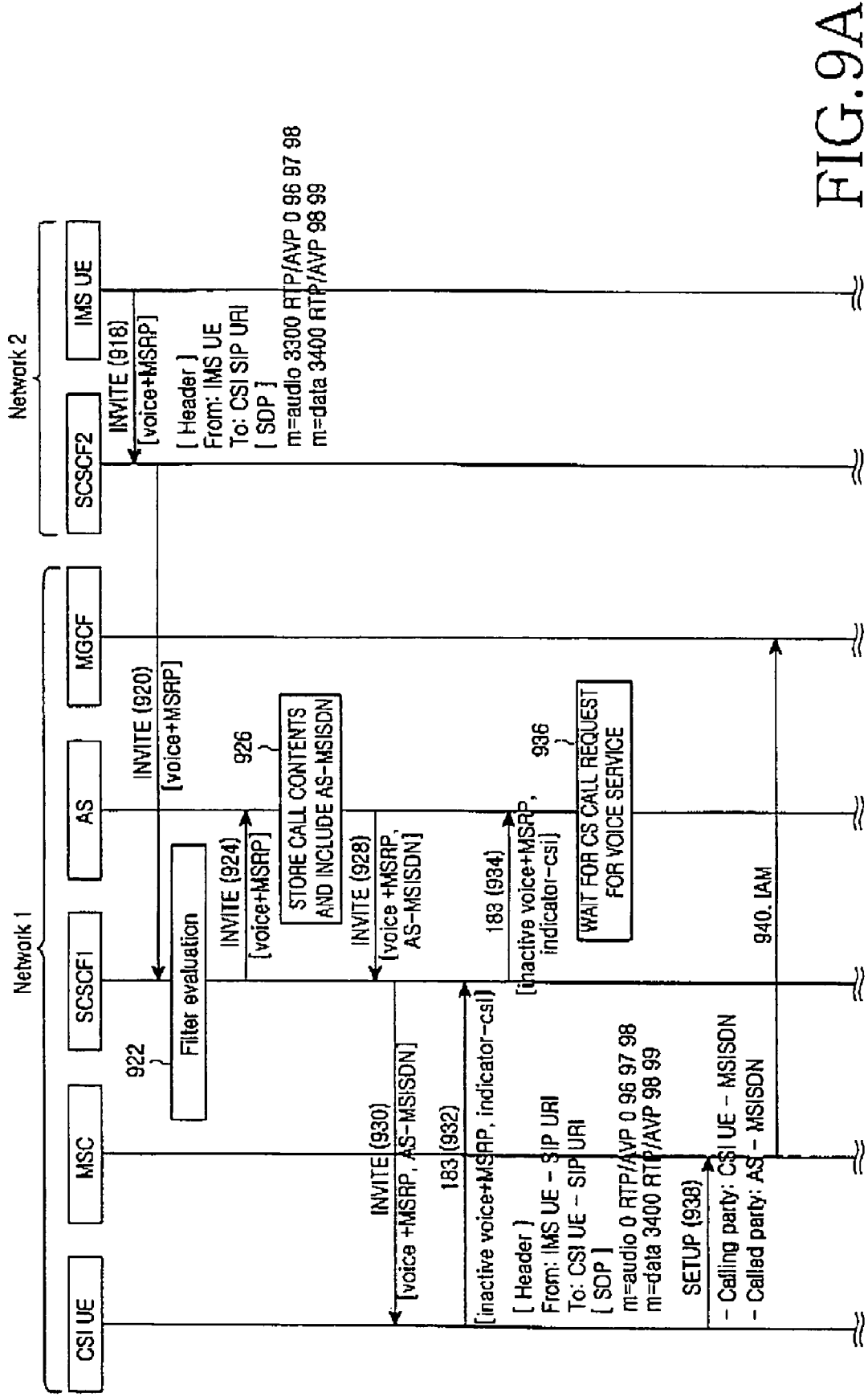
FIGS. 9A and 9B are diagrams illustrating a control flow in the case where the AS sends a call request of an IMS UE to the CSI UE, including its MSISDN in the call request, and uses the MSISDN in identifying a response message according to the present invention.
Figure 9B:
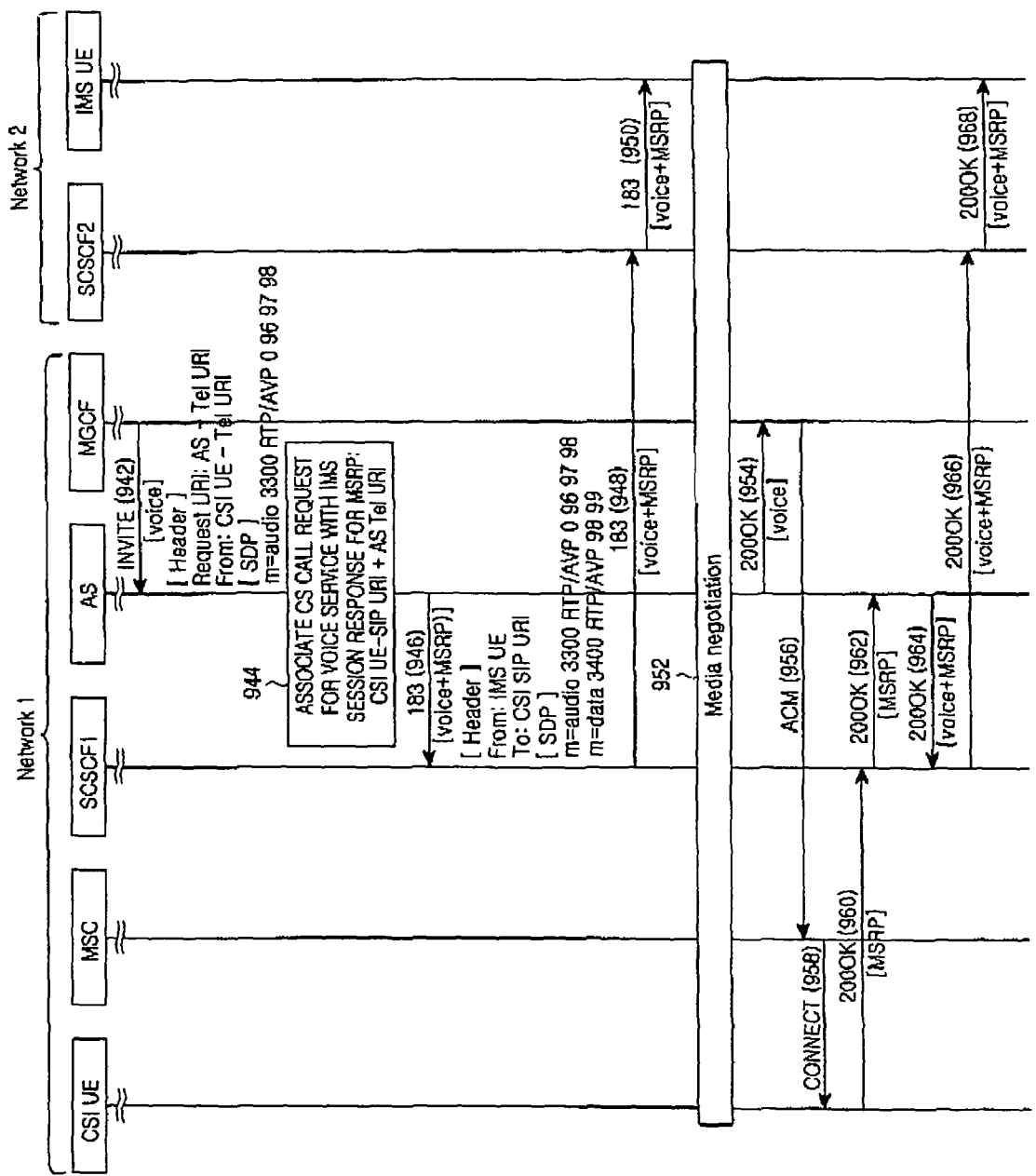

FIGS. 9A and 9B show a control flow in the case where the AS sends a call request of an IMS UE to the CSI UE, including its AS-MSISDN in the call request, and uses the AS-MSISDN in identifying a response message from the CSI UE according to the present invention. The CSI UE registers to the AS in a conventional manner and thus a description of the registration will not be provided herein.

Referring to FIGS. 9A and 9B, upon receipt of an INVITE message including a call request for a voice service and an MSRP service from the IMS UE via S-CSCF 2 in steps 918 and 920, S-CSCF 1 evaluates the INVITE message based on the filter criteria set for the CSI UE in step 922 and sends the INVITE message to the AS in step 924. The AS stores information about the source and destination of the INVITE message for later association and includes its AS-MSISDN in the INVITE message in step 926. This AS-MSISDN is one of a plurality of AS-MSISDNs of the AS. Hence, the AS-MSISDN is used to identify the CSI UE. In steps 928 and 930, the INVITE message is sent to the CSI UE via S-CSCF 1.

Recognizing that the INVITE message includes a request for the voice service, the CSI UE determines to use a CS call for the voice service and, if the INVITE message also indicates the MSRP service, determines to an IMS session for the MSRP service. Hence, the CSI UE sets a port representing a voice service-related part of SDP parameters to '0' to indicate that the voice service is not provided by the IMS session. The SDP parameters are to be included in a 183 message responding to the INVITE message. As stated before, the CSI UE includes a CSI indicator in the 183 message and "From" and "To" are set to the SIP URI of the IMS UE and the SIP URI of the CSI UE, respectively in the header of the 183 message. The CSI UE sends this 183 message to S-CSCF 1 in step 932 and S-CSCF 1 forwards the 183 message to the AS in step 934.

In step 936, the AS awaits reception of a CS call request for the voice service in response to the CSI indicator set in the 183 message. In the mean time, the CSI UE generates a SETUP message to request a CS call for the voice call service as indicated by the INVITE message after sending the 183 message. The SETUP message is set to the MSISDN of the CSI UE as a source and to the AS-MSISDN as a destination. The thus-configured SETUP message is sent to the MSC of the CS domain in step 938. The MSC converts the SETUP message to an IAM message and sends the IAM message to the MGCF in step 940. The source and destination of the IAM message are identical to those of the SETUP message. In step 942, the MGCF converts the IAM message to the INVITE message and sends the INVITE message to the AS.

The INVITE message is for the voice service. The source and destination mapping between of the IAM message and the INVITE message has been described with reference to FIG. 7 and thus will not be described herein. In accordance with the present invention, "From" and "Request URI" are set to the TEL URI of the CSI UE and the TEL URI of the AS in the INVITE message that the MGCF sends to the AS. These TEL URIs can be replaced with SIP URIs as stated before with reference to FIG. 7.

In step 944, the AS generates an association 183 message by associating the 183 message received in step 932 with the INVITE message received in step 942. The AS can identify from the SIP URI of the CSI UE filled in the "To" header of the 183 message that the 183 message is a response for the call request of the IMS UE, and identify from the TEL URI (i.e. AS-MSISDN) of the AS set in the INVITE message that the INVITE message is also a response for the call request of the IMS UE.

In steps 946 to 968, a voice call setup and an MSRP call setup are performed in the same manner as in the procedures of FIGS. 7 and 8.

The control messages related to the IMS session used herein, INVITE, 183, 200 OK, etc. and the control messages related to the CS call, SETUP, IAM, ACM, and CONNECT are replaced/modified with/to other messages with similar functions. The transmission sequence/time instants of the messages may be changed depending on issues like billing from a service provider. For example, the 200 OK messages in steps 768, 862 and 954 may be sent after the 200OK messages in steps 778, 872 and 964.

As is apparent from the above description, when receiving an IMS UE's call request including a request for a real-time service over an IMS domain, a CSI UE can effectively handle a CS call for the real-time service over a CS domain. Since the CSI UE determines whether to use a CS domain depending on situations, it can effectively communicate with the IMS UE over a particular network where a CS domain is not available.

While the invention has been shown and described with reference to certain preferred embodiments of the present invention thereof, it will be understood by those skilled in the art that various changes in form and details may be made therein without departing from the spirit and scope of the present invention as defined by the appended claims and their equivalents.

What is claimed is:

1. A method for processing a call request including a request for a real-time service received from an Internet protocol Multimedia Subsystem (IMS) terminal capable only of an IMS session, the method comprising the steps of:
   receiving, by a Combined Circuit Switched (CS) call and IMS session (CSI) terminal, an INVITE message including call requests for a real-time service and a non-real time service, from the IMS terminal through an Application Server (AS) of an IMS domain;
   creating, by the CSI terminal, a CSI indicator indicating that a CS call is used for the real-time service;
   deactivating, by the CSI terminal, a real-time service-related part of Session Description Protocol (SDP) parameters set in an IMS session response message;
   sending, by the CSI terminal, the IMS session response message including the CSI indicator to the AS;
   sending, by the CSI terminal, a CS call request for the real-time service to the AS;
   receiving, by the AS, the IMS session response from the CSI terminal;
   if the AS receives the CS call request for the real-time service from the CSI terminal over a CS domain, generating, by the AS, a message by associating the IMS session response message with the CS call request; and
   sending, by the AS, the generated message, as a response to the call requests from the IMS terminal, to the IMS terminal,
   wherein the CS call request message includes a pseudo number extracted from the INVITE message, the pseudo number being created by the AS, to enable the AS to recognize that the CS call request message is related to the INVITE message.

2. A method for processing a call request including a request for a real-time service received from an Internet protocol Multimedia Subsystem (IMS) terminal capable only of an IMS session, the method comprising the steps of:
   receiving, by a Combined Circuit Switched (CS) call and IMS session (CSI) terminal, an INVITE message including call requests for a real-time service and a non-real time service, from the IMS terminal through an Application Server (AS) of an IMS domain;
   creating, by the CSI terminal, a CSI indicator indicating that a CS call is used for the real-time service;
   deactivating, by the CSI terminal, a real-time service-related part of Session Description Protocol (SDP) parameters set in an IMS session response message;
   sending, by the CSI terminal, the IMS session response message including the CSI indicator to the AS;
   sending, by the CSI terminal, a CS call request for the real-time service to the AS;
   receiving, by the AS, the IMS session response from the CSI terminal;
   if the AS receives the CS call request for the real-time service from the CSI terminal over a CS domain, generating, by the AS, a message by associating the IMS session response message with the CS call request; and
   sending, by the AS, the generated message, as a response to the call requests from the IMS terminal, to the IMS terminal, wherein the CS call request message includes a telephone number of the AS as destination information and the transmission of the CS call request message comprises transmitting the CS call request message to the AS over the CS domain to which the CSI terminal is connected.

3. The method of claim 2, wherein the telephone number of the AS is received at the CSI terminal from the AS during registration of the CSI terminal to the IMS domain.

4. The method of claim 2, wherein the INVITE message includes the telephone number of the AS.

5. The method of claim 1, wherein the IMS session response message includes an indicator indicating that the CS call is requested for the real-time service.

* * * * *